(12) United States Patent
Haughom et al.

(10) Patent No.: US 6,951,331 B2
(45) Date of Patent: *Oct. 4, 2005

(54) SLEEVE VALVE FOR CONTROLLING FLUID FLOW BETWEEN A HYDROCARBON RESERVOIR AND TUBING IN A WELL AND METHOD FOR THE ASSEMBLY OF A SLEEVE VALVE

(75) Inventors: Per Olav Haughom, Tonstád (NO); Rune Nilsen, Hundvåg (NO)

(73) Assignee: Triangle Equipment AS, Stavanger (NO)

(*) Notice: Subject to any disclaimer, the term of this patent is extended or adjusted under 35 U.S.C. 154(b) by 64 days.

This patent is subject to a terminal disclaimer.

(21) Appl. No.: 10/432,600
(22) PCT Filed: Nov. 30, 2001
(86) PCT No.: PCT/NO01/00477
§ 371 (c)(1),
(2), (4) Date: Aug. 25, 2003
(87) PCT Pub. No.: WO02/46576
PCT Pub. Date: Jun. 13, 2002

(65) Prior Publication Data
US 2004/0041120 A1 Mar. 4, 2004

(30) Foreign Application Priority Data
Dec. 4, 2000 (NO) .............................................. 006170
May 30, 2001 (NO) .............................................. 012664

(51) Int. Cl.$^7$ .............................................. F16K 25/00
(52) U.S. Cl. ........................ 251/180; 166/316; 166/330; 166/386
(58) Field of Search .......................... 251/58, 154, 170, 251/171, 180, 343–345, 145; 137/219–222, 155; 166/142, 167, 169, 316, 320, 321, 330, 331, 332.1, 332.2, 332.4, 332.5, 373, 375, 386, 184

(56) References Cited

U.S. PATENT DOCUMENTS

| 3,581,820 A | * | 6/1971 | Burns ........................ 166/330 |
| 4,080,982 A | | 3/1978 | Maezawa ..................... 137/219 |
| 4,429,747 A | * | 2/1984 | Williamson, Jr. ........... 166/386 |
| 4,506,693 A | | 3/1985 | Acker ........................ 137/116 |
| 4,700,924 A | * | 10/1987 | Nelson et al. ................ 251/58 |
| 4,776,395 A | | 10/1988 | Baker et al. ................ 166/184 |

(Continued)

FOREIGN PATENT DOCUMENTS

| EP | 0427371 A1 | 5/1991 |
| GB | 2201979 A | 9/1988 |

Primary Examiner—Tuan Nguyen
(74) Attorney, Agent, or Firm—Jacobson Holman PLLC

(57) ABSTRACT

A sleeve valve for fluid flow between a hydrocarbon reservoir and a well includes a first sleeve and a second sleeve which are relatively movable between a first position in which at least one opening in the first sleeve is aligned or misaligned with at least one opening in the second sleeve in order to admit or shut off the fluid flow. The first sleeve is provided with a radially movable sealing element that has a sealing surface adapted to rest against the second sleeve around the second sleeve opening, and at least one tension element presses the sealing element with its sealing surface against the second sleeve. A method for the assembly of such a sleeve valve includes a sealing element and a tension element placed in the outer sleeve opening and a clamping tool is adapted to the opening in the sealing element and moved outwards together with the sealing element until the sealing element is flush with the inner surface of the outer sleeve. Thereafter, the inner sleeve is inserted into the outer sleeve and the sealing element is allowed to rest against the inner sleeve and the clamping tool is removed.

13 Claims, 14 Drawing Sheets

U.S. PATENT DOCUMENTS

| | | | |
|---|---|---|---|
| 4,782,896 A | 11/1988 | Witten | 166/116 |
| 4,921,044 A | 5/1990 | Cooksey | 166/116 |
| 4,949,788 A | 8/1990 | Szarka et al. | 166/285 |
| 5,263,683 A | 11/1993 | Wong | 251/145 |
| 5,316,084 A * | 5/1994 | Murray et al. | 166/332.4 |
| 5,911,285 A * | 6/1999 | Stewart et al. | 166/332.4 |
| 6,003,834 A | 12/1999 | Read | 251/30 |
| 6,044,908 A | 4/2000 | Wyatt | 166/332 |

* cited by examiner

SLEEVE VALVE FOR CONTROLLING FLUID FLOW BETWEEN A HYDROCARBON RESERVOIR AND TUBING IN A WELL AND METHOD FOR THE ASSEMBLY OF A SLEEVE VALVE

This is a nationalization of PCT/NO01/00477, filed Nov. 30, 2001 and published in English.

FIELD OF THE INVENTION

The invention relates to a sleeve valve for controlling fluid flow between a hydrocarbon reservoir and a tubing in a well in the hydrocarbon reservoir, where the sleeve valve comprises a first sleeve and a second sleeve that are coaxial and which by means of an actuator or a tool are relatively movable between positions where at least one opening in the first sleeve is aligned or misaligned with at least one opening in the second sleeve in order to admit or shut off the fluid flow.

The invention also relates to a method for the assembly of a sleeve valve comprising a first sleeve in the form of an outer sleeve and a second sleeve in the form of an inner sleeve, where the outer sleeve and the inner sleeve are produced separately.

BACKGROUND OF THE INVENTION

In the recovery of hydrocarbons from hydrocarbon reservoirs, wells are drilled from the seabed or the earth's surface down to and into the reservoir which is under pressure. The well is lined with casing to prevent it from caving in, and placed inside the casing is a tubing that extends from the wellhead on the seabed or the earth's surface into the reservoir. The casing is perforated in the reservoir to enable hydrocarbons to flow into the casing and then into the tubing and up to the wellhead for further treatment.

A hydrocarbon reservoir may contain oil, gas and water. The production conditions, that means primarily the amount of oil, gas and water and the pressure in the reservoir, usually vary through the reservoir and alter during the course of the production time. To be able to control production from the well, that is to say control the inflow of oil, gas and water in the well, it is desirable to be able to shut off and admit the inflow to the well at different points along the tubing.

Water or gas injection is used in some places to maintain the pressure in the reservoir, that is to say that pressurised water or gas is forced into the reservoir from the well, and in that case it may be desirable to control the outflow from the well along the tubing.

Sleeve valves, which can be placed at suitable intervals along the well in the reservoir, can be used to control the flow to or from a well. The sleeve valves comprise an outer sleeve and an inner sleeve that are both provided with openings. The outer sleeve is fixed and forms a part of the tubing, whilst the inner sleeve is movable to align or misalign the openings in the two sleeves in order to admit or shut off flow through the sleeve valve.

The reservoir may extend across a very large area, for example, 2000 metres, and is usually divided into different production zones which may have very different pressure. The tubing extends through the different production zones, and may have one or more sleeve valves in each production zone so as to enable hydrocarbons to be produced from one or more production zones whilst other production zones may be closed. The production zones can be separated from one another by isolation packers that are placed between the casing and the tubing to prevent fluids from leaking between the production zones along the outside of the tubing.

If there is production from a production zone at a pressure of, for example, 200 bar, the tubing will have an internal pressure of approximately 200 bar. If the tubing passes through a production zone where the pressure is, for example, 50 bar, the sleeve valves must be closed in this production zone to prevent outflow from the well. The sleeve valves are thus subjected to a differential pressure of 150 bar between the outside of the outer sleeve and the inside of the inner sleeve.

The reverse may also happen, that is to say that there is production from a production zone having a pressure of 50 bar, and the tubing passes through a production zone where the pressure is 200 bar, where the sleeve valves in order to prevent inflow are closed. In that case, the sleeve valves are also subjected to a differential pressure of 150 bar, in a direction opposite to that of the aforementioned differential pressure.

A high differential pressure in itself can cause leakage. In addition, differential pressure can lead to deformation of the sleeve valves, which can cause the sleeve valves to leak when closed.

The problem associated with leakage of the sleeve valves because of the substantial differential pressures can be solved by using flexible gaskets of a non-metallic material. However, the temperature in the reservoir can be 100° C. or more, and the reservoir may contain constituents that corrode the gasket materials. In sleeve valves where the sealing is based on gaskets, it has been found that leakage often occurs after some time when the valve is in a closed position, and gaskets are thus not a satisfactory solution to the problem.

To avoid gaskets, valves having metal-to-metal seals have been developed. However, metal-to-metal seals have little capacity to absorb the large deformations that can be caused by substantial differential pressures, and therefore also do not provide an adequate solution to the problem of sleeve valves that leak in a closed position when subjected to substantial differential pressures.

GB 2 201 979, U.S. Pat. No. 4,782,896 and U.S. Pat. No. 4,921,044 describe sleeve valves for controlling fluid flow between a hydrocarbon reservoir and a well in the hydrocarbon reservoir, comprising a fixed outer sleeve and an inner sleeve that is movable between positions in which openings in the outer sleeve and the inner sleeve are aligned or misaligned.

SUMMARY OF THE INVENTION

The object of the invention is to provide a solution to the aforementioned problem associated with leakage of the sleeve valves when they are subjected to substantial differential pressures. The object is also to provide a method for the assembly of a sleeve valve where the aforementioned problem is solved.

The object is attained according to the invention by means of a sleeve valve and a method for the assembly of a sleeve valve of the type mentioned in the introduction which is characterised by the features disclosed in the claims.

Accordingly, the invention relates to a sleeve valve for controlling fluid flow between a hydrocarbon reservoir and a tubing in a well in the hydrocarbon reservoir, where the sleeve valve comprises a first sleeve and a second sleeve that are coaxial and which by means of an actuator or a tool are relatively movable between positions in which at least one opening in the first sleeve is aligned or misaligned with at least one opening in the second sleeve in order to admit or shut off the fluid flow.

According to the invention, the first sleeve, in a recess or in the opening, is provided with a radially movable sealing element that has a sealing surface adapted to rest against the second sleeve around the second sleeve opening. Furthermore, at least one tension element is disposed between corresponding bearing portions of the sealing element and the first sleeve, which tension element presses the sealing element with its sealing surface against the second sleeve, so that a seal against the second sleeve is obtained. The seal is dependent upon the force from the tension element or tension elements, and through a correct sizing of the tension element or tension elements it is possible to provide a good seal that is capable of withstanding substantial differential pressures.

The first sleeve may be an outer sleeve, and the second sleeve will in that case be an inner sleeve. The reverse may also be the case: the first sleeve may be an inner sleeve and the second sleeve will in that case be an outer sleeve. The sealing element can thus be placed either in the outer sleeve or in the inner sleeve, and seal against the inner sleeve or the outer sleeve, as the case may be.

The radially movable sealing element can be placed in the first sleeve opening, and can have a through-going radial opening adapted to correspond with the second sleeve opening. The fluid flow thus flows through the sealing element when the sleeve valve is in an open position.

The at least one tension element may be in the form of a helical spring, it may be a spring comprising an elastomeric material, or it may consist of one or more leaf springs or a disc spring. In a preferred embodiment the tension element consists of a stack of disc springs.

The sleeve valve may be of a type where the first and second sleeves are relatively movable in that the first or the second sleeve is rotatable about the longitudinal direction of the tubing, the first or second sleeve may be slidable in the longitudinal direction of the tubing, or a combination of both, for example, the first or second sleeve can be movable along a helical path in the longitudinal direction of the tubing. The first and second sleeve can have one or more openings that correspond with corresponding openings in the second or first sleeve. The relative movability of the two sleeves can be effected by using a remote-controlled tool that is powered by an electric or hydraulic motor, for example, via coiled tubing or electric cables. Alternatively, the inner sleeve can be moved via a drill string. In both cases, the movement can be transmitted to the inner sleeve via a gripping tool having clamping jaws that are actuated electrically or hydraulically. The relative movability of the two sleeves can also be produced by means that are integral parts of the sleeve valve, for example, hydraulic cylinders. In addition to being movable between positions in which the openings in the two sleeves are aligned or misaligned, the sleeve valve can also be movable to intermediate positions, so as to enable the fluid flow to be controlled to intermediate positions between closed and fully open flow. The sleeve openings may be arranged in rows along the sleeves, and be arranged symmetrically around the sleeves.

The invention also relates to a method for the assembly of a sleeve valve comprising a first sleeve in the form of an outer sleeve and a second sleeve in the form of an inner sleeve, where the outer sleeve and the inner sleeve are produced separately. According to the invention, a sealing element and a tension element are placed in the outer sleeve opening, with the tension element disposed between corresponding bearing portions on the sealing element and the outer sleeve, which causes the sealing element with its sealing surface to project beyond the inner surface of the outer sleeve. A clamping to $\delta 1$ with clamping jaws adapted to the opening of the sealing element is placed outside the outer sleeve opening, and the clamping jaws are inserted into the opening of the sealing element and clamped against the inner surface of the sealing element opening. The clamping jaws with the clamped sealing element are then moved outwards in the outer sleeve opening until the sealing surface of the sealing element is essentially flush with or projects beyond the inner surface of the outer sleeve, whereupon the inner sleeve is inserted into the outer sleeve, the clamping jaws with the clamped sealing element are moved inwards in the outer sleeve opening until the sealing surface of the sealing element rests against the inner sleeve, and the clamping jaws are released from the sealing element and the clamping tool is removed.

BRIEF DESCRIPTION OF THE DRAWINGS

The invention will now be described in more detail in connection with a description of a specific embodiment, and with reference to the drawings, wherein:

FIG. 1 shows a petroleum reservoir with a well;

FIG. 1 shows a section through a seabed 45 with underlying rocks. A hydrocarbon reservoir 4 is located beneath an impermeable mantle rock 46.

BRIEF DESCRIPTION OF THE PREFERRED EMBODIMENTS

Figure 7:
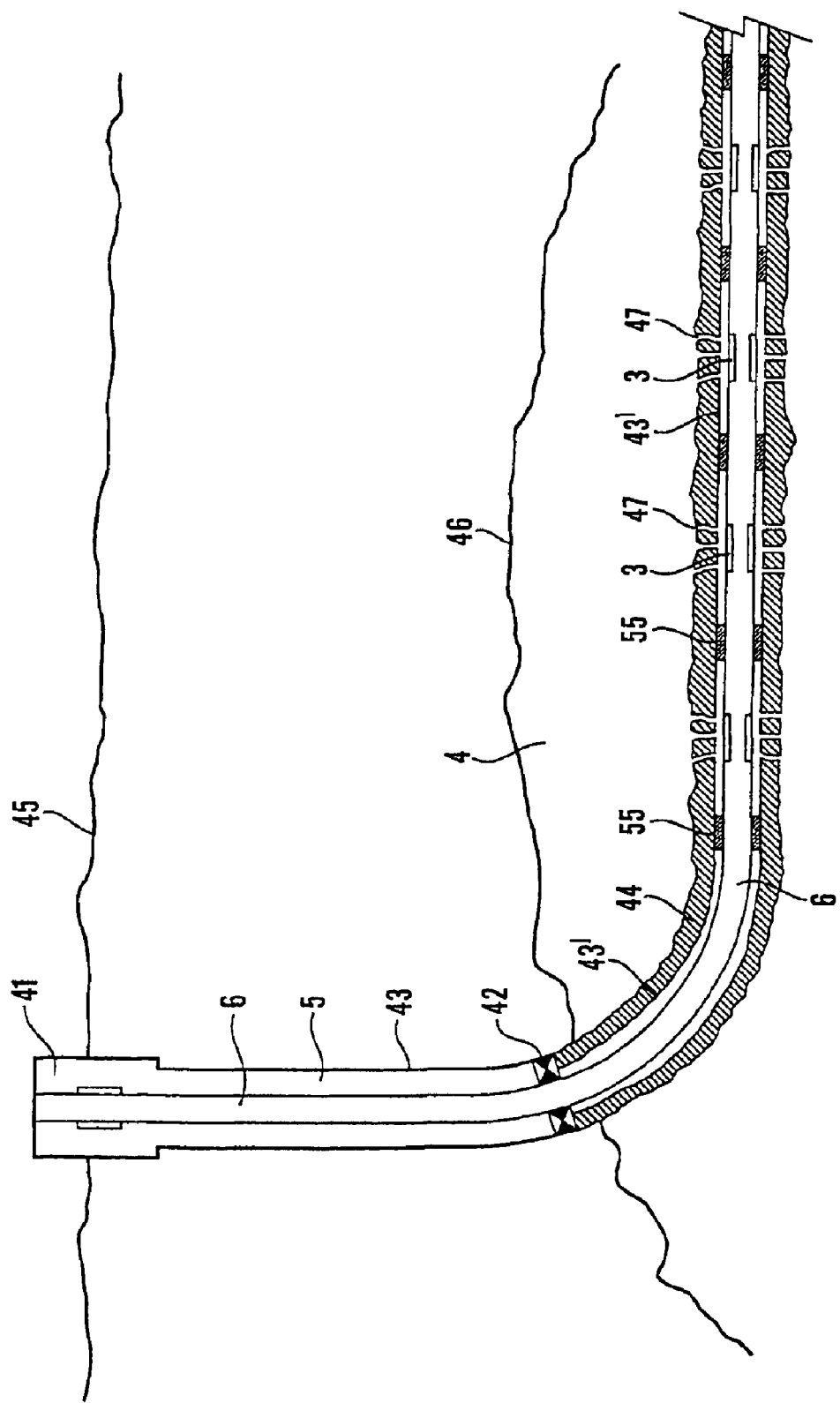
FIG. 7 is a longitudinal section corresponding to a sectional view taken along the line VII—VII in FIG. 2, with a clamping tool for use in connection with the method according to the invention.

A well 5 has been drilled from the seabed 45 down to and into the hydrocarbon reservoir 4. The part of the well 5 that is outside the reservoir 4 is lined with a casing 43, and inside the well the reservoir is lined with a casing 43' in order to prevent the well 5 from caving in. The space between the wall of the drilled well and the casing 43' inside the reservoir 4 is filled with concrete 44. Disposed within the casing is a tubing 6 that extends from a wellhead 41 on the seabed 45 into the reservoir 4. Perforations 47 in the concrete 44, which perforations can be made by firing projectiles through the concrete, permit fluids in the reservoir 4 to flow through the concrete 44 and the wall of the casing 43' and into the space between the casing 43' and the tubing 6. A production packer 42 disposed between the casing 43' and the tubing 6 prevents fluids in the reservoir 4 from flowing up in the well 5 between the casing 43 and the tubing 6.

The production conditions in the reservoir 4, that means primarily the amount of oil, gas and water and the pressure in the reservoir, vary along the tubing 6, and will alter during the course of the production time. To be able to control production from the well 5 along the tubing 6, that is to say control the inflow of oil, gas and water in the tubing 6, the reservoir 4 is divided into different production zones which may have very different pressure. The production zones are separated from one another by isolation packers 55 that are positioned between the casing 43' and the tubing 6 and prevent fluids from leaking between the production zones.

The tubing 6 extends through the different production zones, and has a sleeve valve 3 in each production zone. When a sleeve valve 3 is open, fluids are permitted to flow from the reservoir 4 in the respective production zone into the tubing 6 and up to the wellhead 41 for further treatment. By opening or closing the different sleeve valves 3, hydrocarbons can be produced from one or more production zones, whilst other production zones may be closed.

Figure 2:
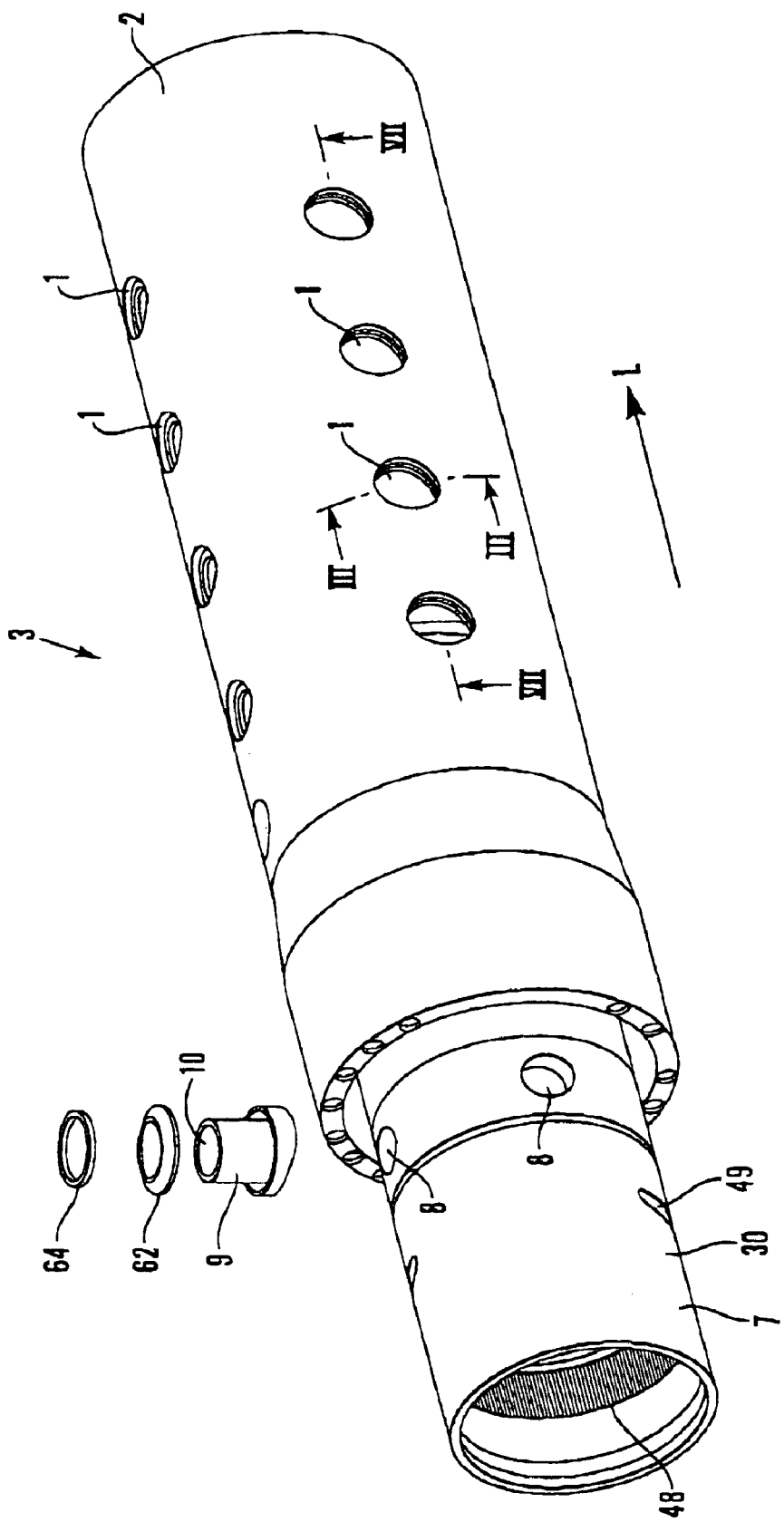
FIG. 2 shows a sleeve valve according to the invention.

FIG. 2 shows a sleeve valve 3 according to the invention. The sleeve valve 3 comprises a first sleeve in the form of an outer sleeve 2 that has openings 1. The outer sleeve 2 is fixed and forms a part of the tubing 6, which is not shown in FIG. 2. A movable second sleeve in the form of an inner sleeve 7, which is shown partly outside the outer sleeve 2, is disposed within the outer sleeve 2 when the sleeve valve 3 is assembled. The assembly of the inner sleeve 7 and the outer sleeve 2 is carried out by passing the inner sleeve in the direction L, which is the longitudinal direction for the tubing 6, the inner sleeve 7 and the outer sleeve 2. Non-illustrated pins inside the outer sleeve interact in assembled position with a guide groove 49 in the inner sleeve 7, so as to prevent the inner sleeve 7 from sliding out of the outer sleeve 2. The inner sleeve 7 is provided with internal grooves 48 that can be gripped by an actuator or a tool in order to rotate the inner sleeve 7 between positions in which the outer sleeve openings 1 are aligned or misaligned with openings 8 in the inner sleeve 7 in order to open or close the fluid flow from the reservoir to the interior of the inner sleeve 7. The inner sleeve 7 is open at the ends, and the fluids can therefore flow on freely in the tubing 6. FIG. 2 also shows a sealing element 9, a tension element in the form of a disc spring 62 and an O-ring 64 which will be discussed in detail below.

Figure 3:
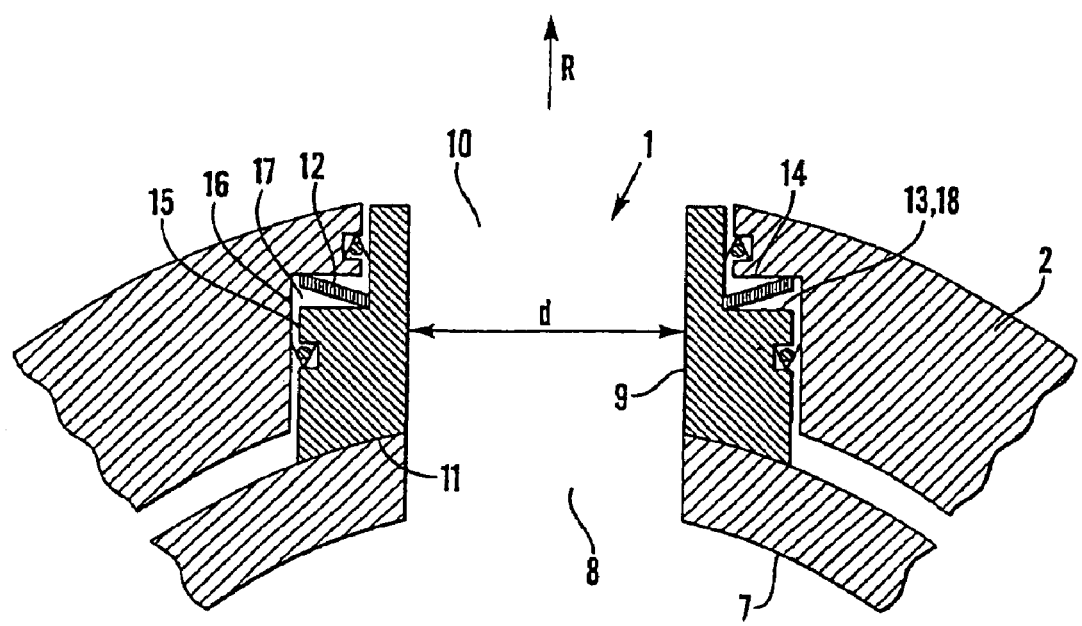
FIG. 3 is a sectional view taken along the line III—III in FIG. 2, where the sleeve valve is in an open position.

FIG. 3 shows a cross-section through an opening 1 in the outer sleeve 2 in FIG. 2, taken along the line III—III, although with the difference that the tension element, instead of being a disc spring, consists of a helical spring 60. The sleeve valve is shown in an open position, wherein it can be seen that the outer sleeve opening 1 is aligned with the inner sleeve's 7 opening 8. The outer sleeve opening 1 is provided with a sealing element 9 that is movable away from and towards the inner sleeve 7 in a radial direction R or the opposite of R. The movability of the sealing element in the direction R and the opposite of R is provided in that the sealing element 9 has a side face 15 that is adapted to the side face 16 of the outer sleeve opening 1. The sealing element 9 has a through-going radial opening 10 that is adapted to correspond with the opening 8 in the inner sleeve. The part of the sealing element 9 facing the inner sleeve 7 has around the through opening 10 a sealing surface 11 that is adapted to rest against the inner sleeve 7 around the inner sleeve opening 8.

The helical spring 60 is disposed between bearing portions 13 on the sealing element 9 and corresponding bearing portions 14 on the outer sleeve 2, and presses the sealing element 9 with its sealing face 11 against the inner sleeve 7. A seal is thus obtained in the sleeve valve 3. However, the seal between the sealing element 9 and the inner sleeve 7 has little importance in the open position of the sleeve valve 3, where it is the very intention that fluids should flow through the sleeve valve.

Figure 4:
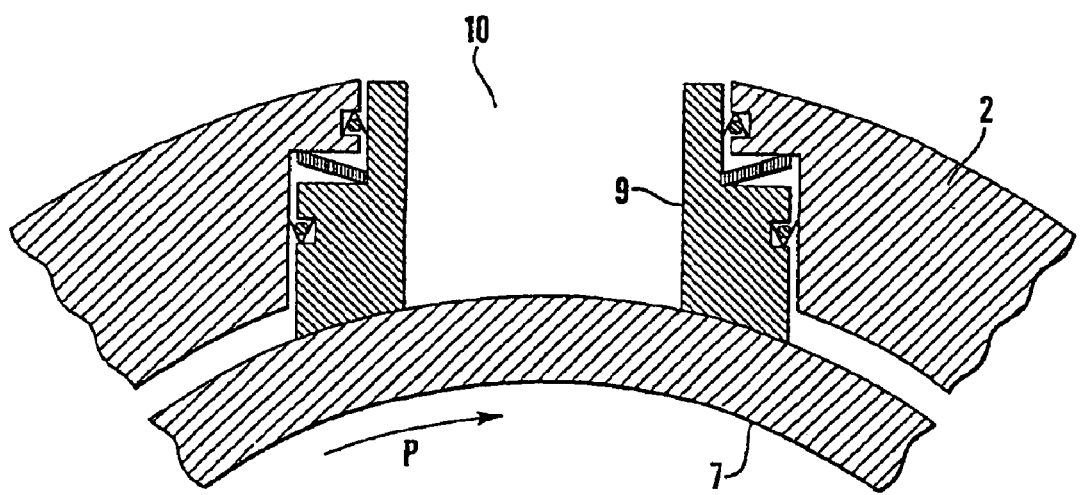
FIG. 4 is a sectional view taken along the line III—III in FIG. 2, where the sleeve valve is in a closed position.

FIG. 4 shows the same opening 1 in the outer sleeve 2 as that shown in FIG. 3, in the closed position, which has been reached in that the inner sleeve 7 has been rotated in the direction P until the inner sleeve opening 8 is misaligned with the outer sleeve opening 1 and the opening 10 in the sealing element. In the closed position, the seal between sealing element 9 and the inner sleeve 7 is of major importance, as fluids that leak in between the sealing element 9 and the inner sleeve 7 will find their way into the tubing 6. As discussed in the general part of the description, the sleeve valves can, when closed, be subjected to great differential pressures which, apart from having the potential themselves to cause leakage, may also lead to great deformation of the sleeve valves, which may cause the sleeve valves to leak in the closed position.

Figure 5:
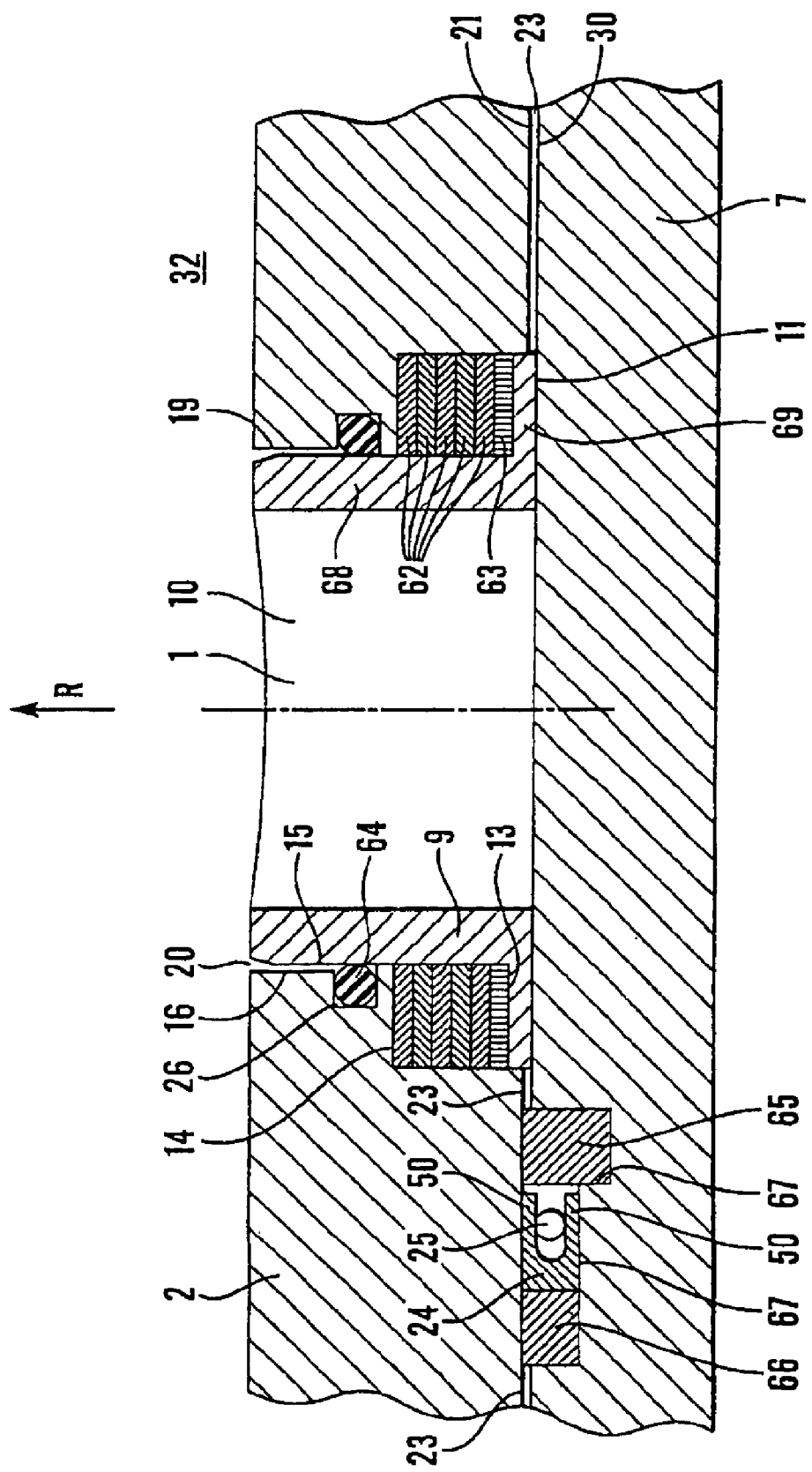
FIG. 5 is a sectional view taken along the line VII—VII in FIG. 2, where the sleeve valve is in a closed position.

FIG. 5 shows a section through an opening 1 in the outer sleeve in FIG. 2, taken along the line VII—VII, where the sleeve valve is in a closed position. Unlike that shown in FIGS. 2–4, the tension element in this case consists of a stack of disc springs 62. The stack of disc springs 62 rests on one side against the bearing portion 14 of the outer sleeve, and on its other side against a pressure distribution disc 63 which in turn rests against the bearing portion 13 of the sealing element.

The side face 15 of the sealing element and the side 16 of the outer sleeve opening form between them an outwardly directed slot 20 leading to the outer surface 19 of the outer sleeve 2. To prevent leakage through the slot 20, at least one seal, which is placed in a recess in the outer sleeve 2 or the sealing element 9, is preferably arranged between the outer sleeve 2 and the sealing element 9. With reference to FIG. 5, it can be seen that this is accomplished by arranging an O-ring 64 in a recess 26 in the outer sleeve 2 between the outer sleeve 2 and the sealing element 9.

The inner surface 21 of the outer sleeve and the outer surface 30 of the inner sleeve define between them a slot 23. To prevent leakage through the slot 23, around or on one or both sides of the outer sleeve opening 1, there is provided at least one seal between the outer sleeve 2 and the inner sleeve 7, which seals are placed in recesses in the outer sleeve 2 or the inner sleeve 7. With reference to FIG. 5, it can be seen that this is accomplished by means of a first sealing ring 65 arranged closest to the outer sleeve opening 1, a double U-shaped lip seal 24, and a second sealing ring 66 placed farthest from the outer sleeve opening 1. It can be seen that the seals 24, 65, 66 are placed in recesses 67 in the inner sleeve 7. The sealing rings 24, 65, 66 are circular and extend around the circumference of the inner sleeve 7.

The lip seal 24 comprises two lips 50 that are joined and form a U that is open towards the outer sleeve opening 1. A central member 25 in the one-way seal 24 holds the lips 50 essentially in place. The lips are made of a synthetic stiff, elastic material and are elastically deformable.

When the sleeve valve is closed in order to shut off inflow from the area 32 outside the outer sleeve, the pressure will be higher in the sealing element opening 10 than inside the sleeve valve, and the pressure in the part of the slot 23 that is located between the sealing element opening 10 and the lip seal 24 will therefore be higher than the pressure in the slot 23 on the opposite side of the lip seal 24. This difference in pressure causes the lips to be squeezed against the inner surface 21 of the outer sleeve and the outer surface 30 of the inner sleeve, so that fluid is prevented from flowing past the seal 24 from the seal member opening 10. It will be understood that the lip seal 24 could also have had a V-shape, and performed the same function.

It can be seen that the sealing element 9 comprises a cylindrical portion 68 that is adapted to sliding movement in the outer sleeve opening 1, and a collar portion 69 that on one side 11 bears against the inner sleeve 7 around the outer sleeve opening 1 and on the opposite side forms a rest for the tension element, in this case the stack of disc springs 62.

In the above, mention is made of several examples of embodiments of tension elements, at least one tension element consisting of, for example, a helical spring 60, a disc spring 62 or a stack of disc springs 62. A disc spring is a tension ring of steel which when unloaded is conical in shape. When compressed in the radial direction R the tension ring is deformed elastically and becomes flatter in shape, which produces a tension force.

It has been found that owing to of the force from the tension element or elements, the sealing element provides a good seal against the inner sleeve, and that leakage through the sleeve valve when closed, even when there are substantial differential pressures, is completely or essentially prevented.

Figure 6:
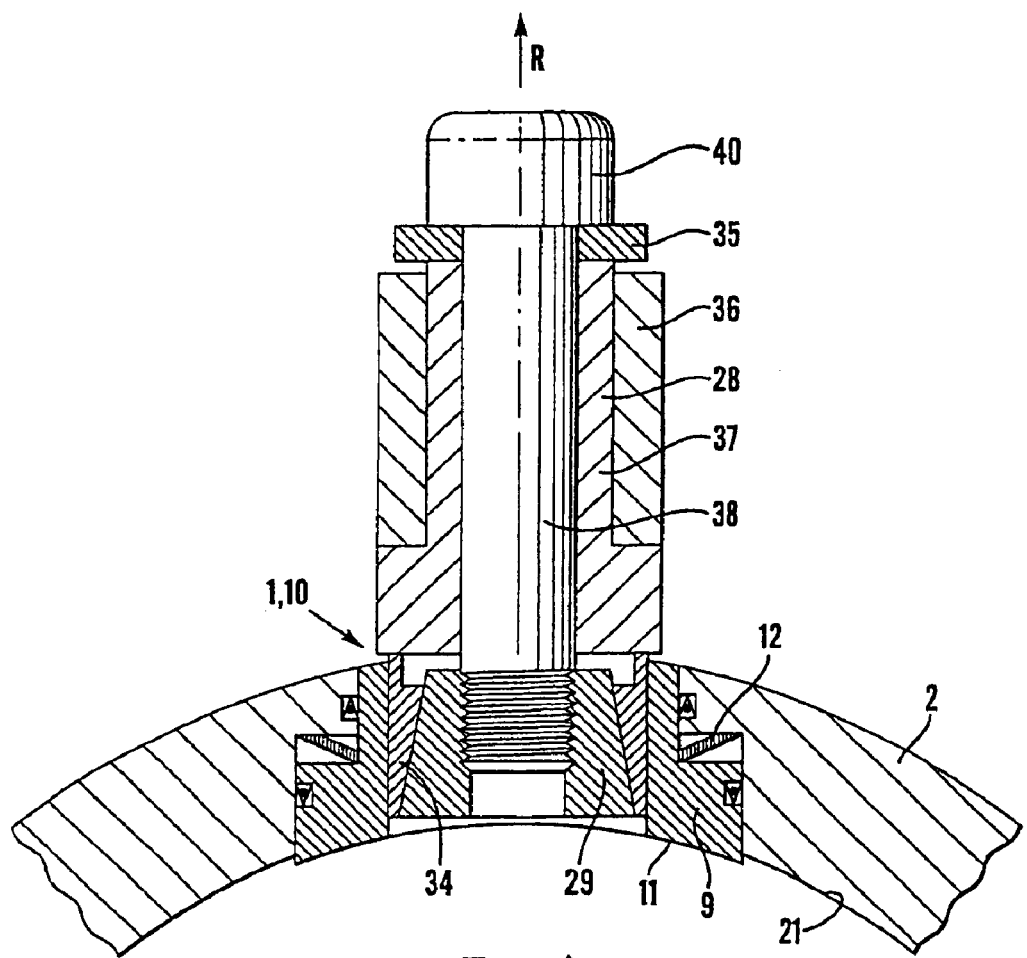
FIG. 6 is a sectional view corresponding to a sectional view taken along the line III—III in FIG. 2, with a clamping tool for use in connection with a method according to the invention.

FIG. 6 shows another example of a tension element, wherein the tension element consists of a ring 61 of elastomeric material. The tension element can also be made of several types of materials, and can, for example, consist of a combination of steel and an elastomeric material.

In a non-illustrated embodiment, the opening 10 in the sealing element can be adapted to choke the flow through the outer sleeve opening 1 and the inner sleeve opening 8 to a desired value. This can be accomplished by selecting a suitable internal diameter d for the opening in the sealing element, see FIG. 3, as the opening 10 in the sealing element, in order to obtain a choking effect, must be smaller than the outer sleeve and inner sleeve openings 1 and 8 respectively. The installation of sealing elements having suitable openings, in some cases possibly sealing elements without openings, will allow a standard sleeve valve having a given number of openings in the outer sleeve, for example, 20 openings, to be used if it is desirable to have a certain choking of the inflow from the reservoir 4 to the tubing 6, and where it would in fact have been sufficient to use a sleeve valve with a smaller number of openings in the outer sleeve.

The inner sleeve 7 illustrated and described in the above is one that is movable relative to the outer sleeve 2 in that it is rotatable in the direction P (see FIG. 4) about the longitudinal direction L (see FIG. 2) of the tubing 6. However, the invention is not dependent upon how the relative movability of the first and second sleeve is accomplished, and the invention could also be used in a sleeve valve where, for example, the inner sleeve 7 is movable relative to the outer sleeve 2 in that it is slidable in the longitudinal direction L of the tubing 6, or where the inner sleeve 7 is movable relative to the outer sleeve 2 in that it is movable along a helical path in the longitudinal direction L of the tubing 6.

Although FIG. 2 may give the opposite impression, the sealing element 9, described with reference to FIGS. 2–5, must, be inserted into the outer sleeve opening 1 from the inside of the outer sleeve, as the sealing element 9 is larger than the outer sleeve opening 1. This means that the sealing element 9 must be inserted into the outer sleeve before the inner sleeve 7. However, the tension element 12 presses the sealing element 9 inwards in the direction opposite to R, see FIG. 5, and when the inner sleeve 7 is not inside the outer sleeve 2, the sealing element 9 will therefore project in so far that it prevents the inner sleeve 7 from being inserted into the outer sleeve 2.

In the method according to the invention, this problem is solved in that the outer sleeve 2 and the inner sleeve 7 are first made separately, for example, by machining tubes. During the installation of the inner sleeve in the outer sleeve, a sealing element 9 and a tension element 60, 61 or 62 as discussed above, optionally a stack of tension elements 62, are placed in the outer sleeve opening 1, with the tension element arranged between corresponding bearing portions 13, 14 on the sealing element 9 and the outer sleeve 2 respectively. The sealing element 9 with its sealing surface 11 thus projects beyond the inner surface 21 of the outer sleeve.

Subsequently, with reference to FIG. 6, a clamping tool 28 having clamping jaws 29, 34 adapted to the opening 10 in the sealing element is positioned outside the outer sleeve opening 1, and the clamping jaws 29, 34 are inserted into the opening 10 in the sealing element and clamped against the inner surface of the opening 10 of the sealing element. With the illustrated tool, this is done in that the inner and outer clamping jaws 29, 34 are conical. The clamping jaw 34 consists of several segments which at their end rest against a sleeve 37, which via a washer 35 rests against a screw head 40 on a tightening screw 38. When the tightening screw 38 is tightened, interacting threads on the tightening screw 38 and the inner clamping jaw 29 cause the clamping jaw 29 to be drawn inside the clamping jaw 34, which because of the conical form of the clamping jaws causes the segments in the clamping jaw 34 to be pressed against the inner surface of the opening 10 in the sealing element. The sealing element 9 is thus held in the clamping tool 28.

The clamping jaws 29, 34 and the clamped sealing element 9 are then moved outwards in the outer sleeve opening 1 in the direction R until the sealing surface 11 of the sealing element is essentially flush with or projects beyond the inner surface 21 of the outer sleeve. With reference to FIG. 7, which shows a longitudinal section through a sleeve valve where the inner sleeve 7 is mounted inside the outer sleeve 2, this is done in that sleeves 37 for several tightening screws 38 are held in a common block 36. Positioning screws 39 that are in engagement with threads in the block 36 rest against the outer surface 19 of the outer sleeve 2, and the tightening of the positioning screws 39 causes the block 36 and the sleeves 37, the tightening screws 38 and the clamping jaws 29, 34, and the sealing element 9, to be pressed away from the outer sleeve 2 in the direction R (see FIG. 6), which results in the sealing surfaces 11 of the sealing elements, after the positioning screws 39 have been tightened a little, being essentially flush with or projecting beyond the inner surface 21 of the outer sleeve.

Space is thus made for the insertion of the inner sleeve 7 in the outer sleeve 2, and the inner sleeve 7 is then inserted into the outer sleeve 2. The clamping jaws 29, 34 with the clamped sealing element 9 are then moved inwards in the outer sleeve opening 1 until the sealing surface 11 of the sealing element rests against the inner sleeve 7. With the illustrated tool 28, this is done by loosening the positioning screws 39 so that the block 36 with the sleeves 37 moves towards the outer sleeve 2, and the tightening screws 38 with the clamping jaws 29, 34 and the sealing element 9 are again moved inwards in the outer sleeve opening 1, until the sealing surface 11 of the sealing element rests against the inner sleeve 7.

The clamping jaws 29, 34 are then loosened from the sealing element 9, and the clamping tool 28 is removed.

Figure 8:
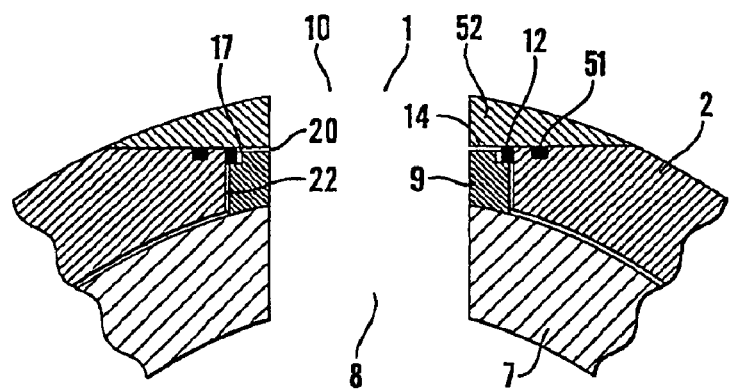
FIG. 8 is a sectional view corresponding to a sectional view taken along the line VIII—VIII in FIG. 9, for another sleeve valve according to the invention.
Figure 7:
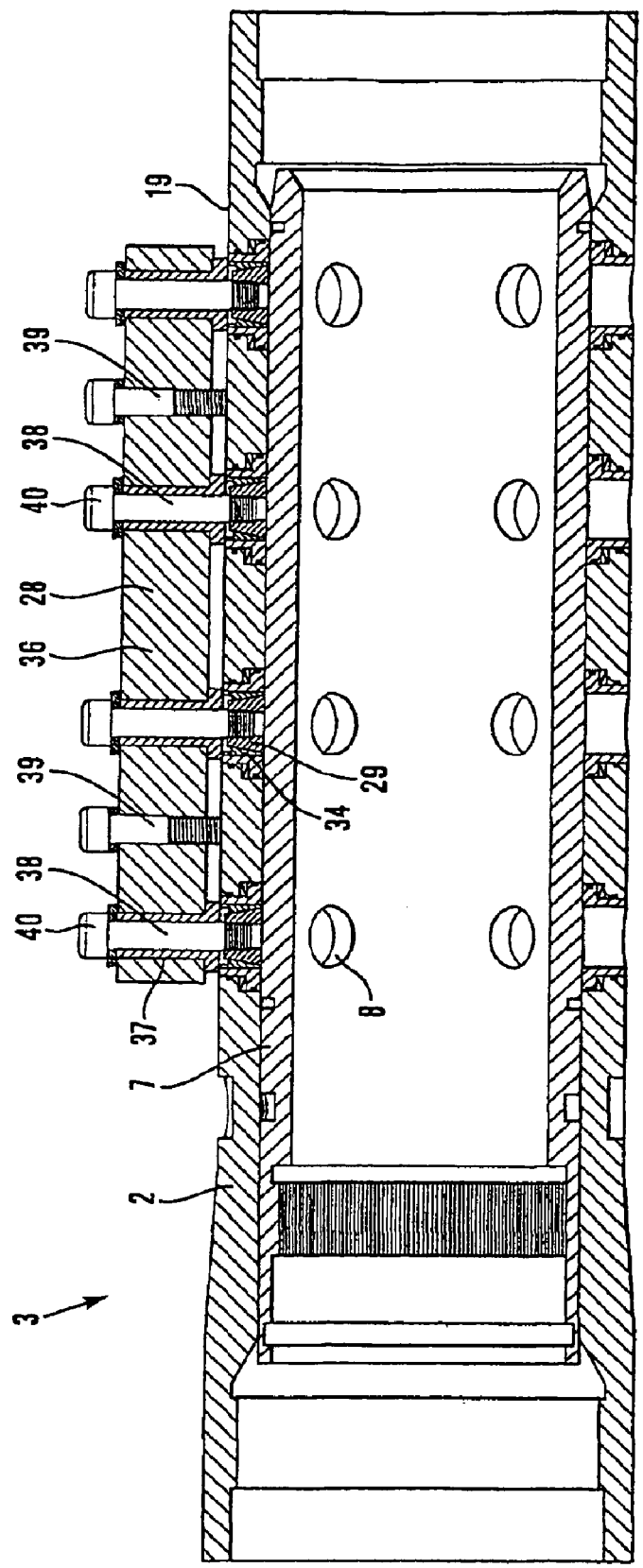

FIG. 8 shows a cross-section through a second embodiment of an opening 1 in an outer sleeve 2 according to the invention, in an open position. A sealing element 9 is pressed by means of a tension element 62 in the form of a disc spring against the inner sleeve 7. In this embodiment, the portion of the outer sleeve 2 that is around the outer portion of the outer sleeve opening 1, and which comprises the outer sleeve's bearing portion 14 for the tension element 62, consists of a removable cover 52. A sealing ring 51 provides a seal between the cover 52 and the outer sleeve 2.

Figure 9:
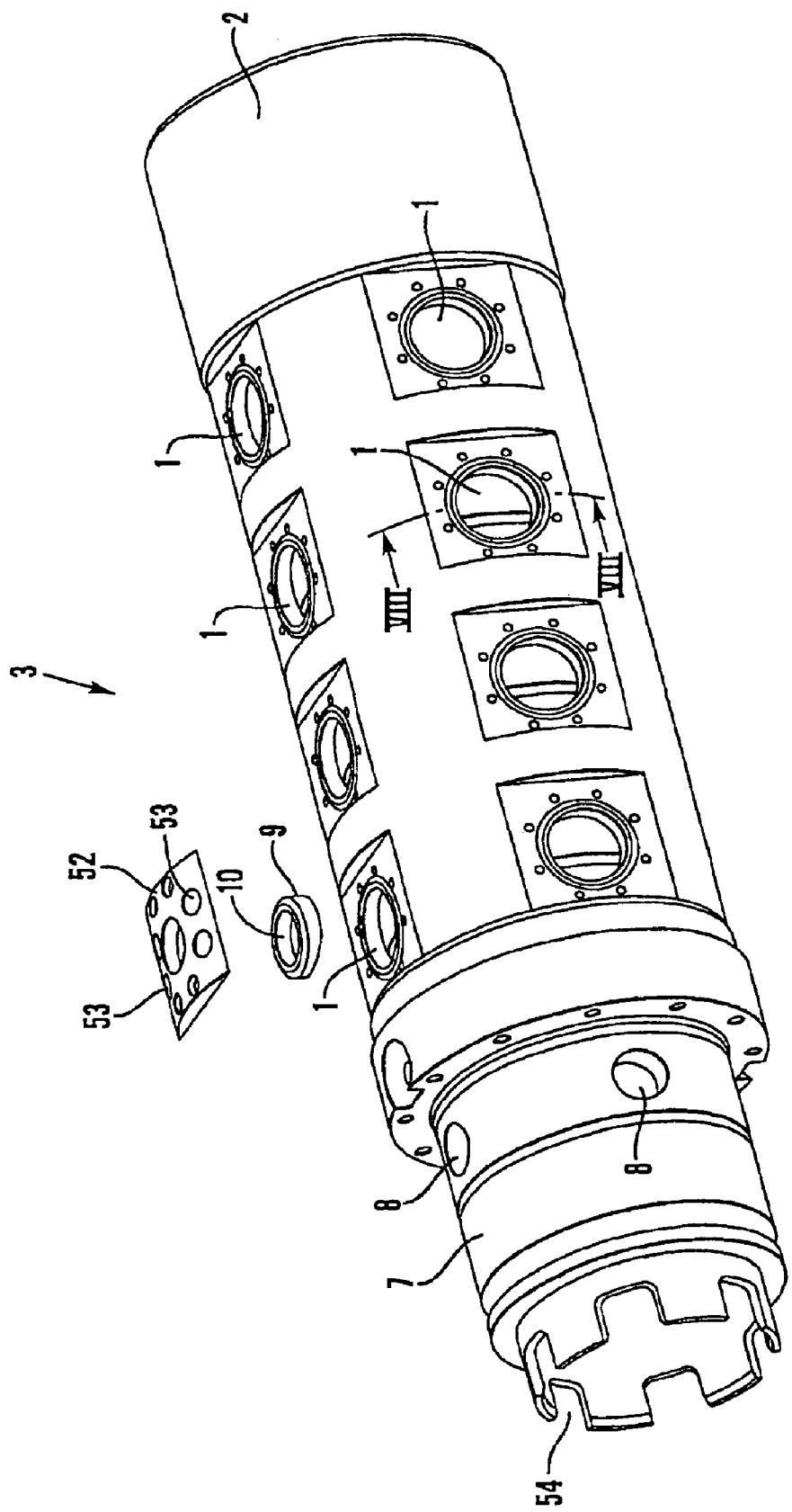
FIG. 9 shows a sleeve valve with an outer sleeve that has openings according to the embodiment shown in FIG. 8.

FIG. 9 shows a sleeve valve 3 having an outer sleeve 2 which has openings 1 that are shaped as shown in FIG. 8, where the covers 52 have been taken off. The inner sleeve 7, which by means of a grip portion 54 can be gripped and rotated in the direction P by a suitable tool, is in the process of being inserted into the outer sleeve 2. The sealing elements 9 can in this embodiment be inserted into the outer sleeve openings 1 from the outside, after the inner sleeve 7 has been put in place, and the problem described above relating to the insertion of the sealing elements, and which can be solved by using the tool shown in FIGS. 6 and 7, is not present in the embodiment shown in FIG. 9. A sealing element 9 and a disc spring 62 are shown between an opening 1 in the outer sleeve and a cover 52. The cover 52 can by means of non-illustrated screws through screw holes 53 be screwed in place on the outer sleeve 2 and press the sealing element 9 and a non-illustrated tension element into the opening 1 in the outer sleeve, so that the sealing element 9 is pressed against the inner sleeve 7.

Figure 10:
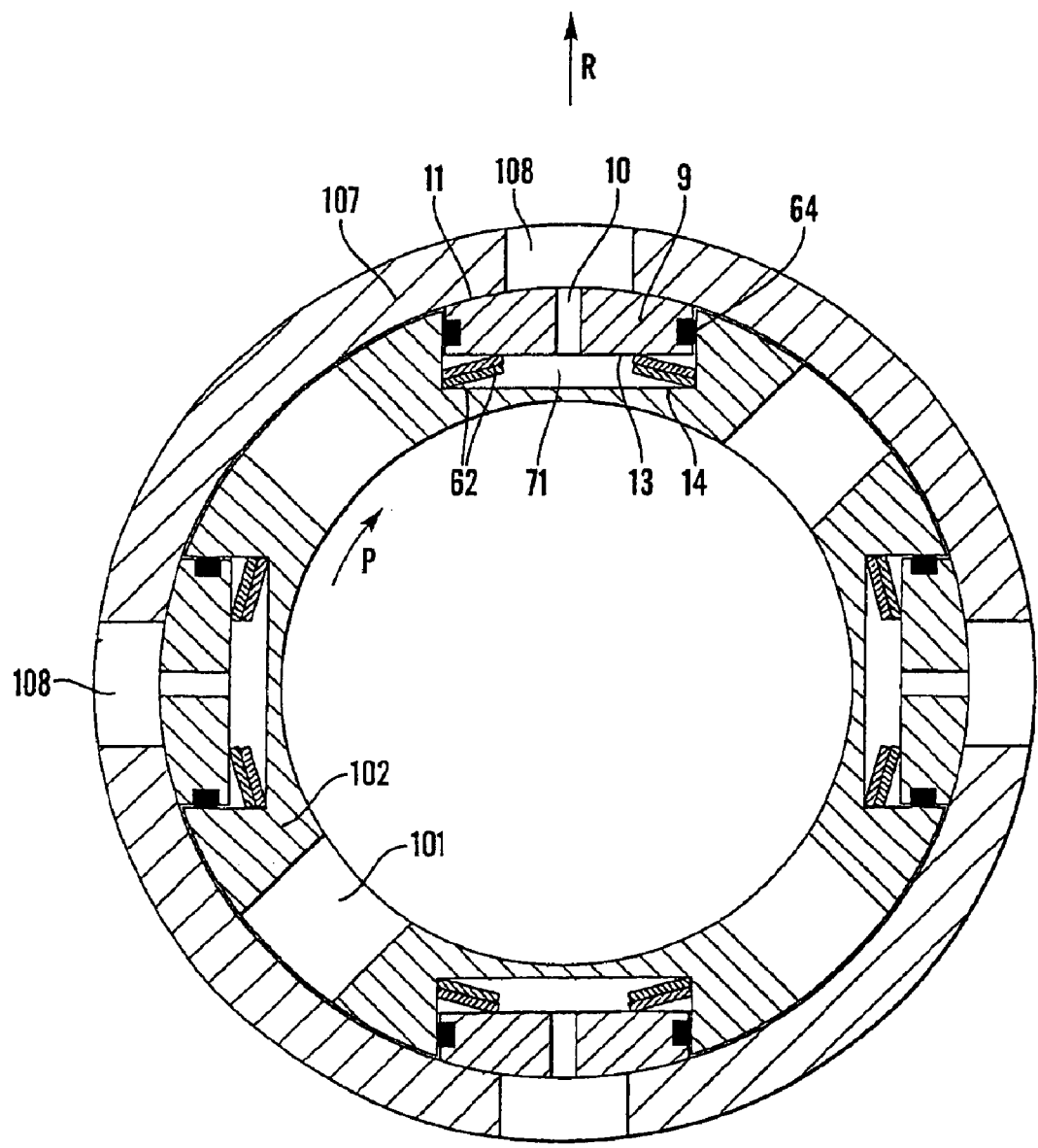
FIGS. 10–16 show cross-sections through alternative embodiments of sleeve valves according to the invention.

FIG. 10 shows a cross-section through another sleeve valve according to the invention, taken through the openings in the sleeves, corresponding to the line III—III in FIG. 2. In the sleeve valve in FIG. 10, the first sleeve consists of an inner sleeve 102, whilst the second sleeve consists of an outer sleeve 107. A sealing element 9 that is radially movable in the direction R is placed in a recess 71 in the inner sleeve 102. An O-ring 64 seals between the sealing element 9 and the side wall in the recess 71. The sealing element 9 has a sealing surface 11 that is adapted to rest against the inner surface of the outer sleeve 107, around the outer sleeve opening 108. Tension elements in the form of two disc springs 62 are arranged between a bearing portion 13 on the sealing element 9 and a bearing portion 14 in the bottom of the recess 71, and press the sealing element 9 with its sealing face 11 against the outer sleeve 107. The sealing element 9 has a through-going radial opening 10 that permits pressure equalisation through the recess 71 and the opening 108 in the outer sleeve 107. The sleeve valve in FIG. 10 is shown in a closed position. The sleeve valve can be brought into an open position by the relative rotation of the two sleeves 102, 107 in the direction P, so that the inner sleeve openings 101 are brought into alignment with the outer sleeve openings 108, and fluids are allowed to flow between the outside of the outer sleeve 107 and the inside of the inner sleeve 102.

Figure 11:
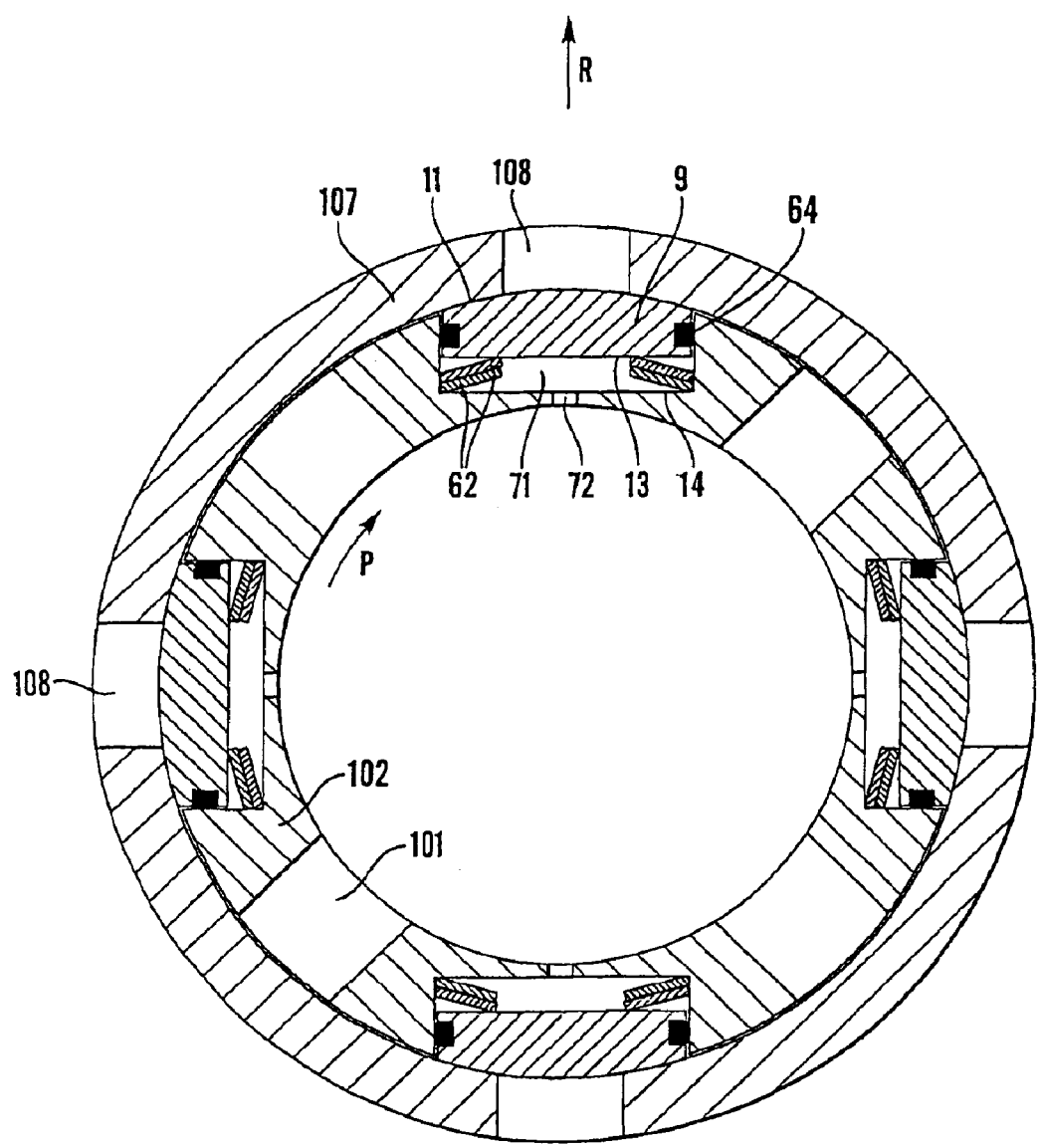

FIG. 11 shows a cross-section through another sleeve valve according to the invention. The sleeve valve in FIG. 11 is similar to the sleeve valve in FIG. 10, but with the difference that the radial opening 10 in the sealing element for pressure equalisation between the recess 71 and the outer sleeve opening 108 has been replaced by a pressure equalising opening 72 between the recess 71 and the inner surface of the inner sleeve 102.

Figure 12:
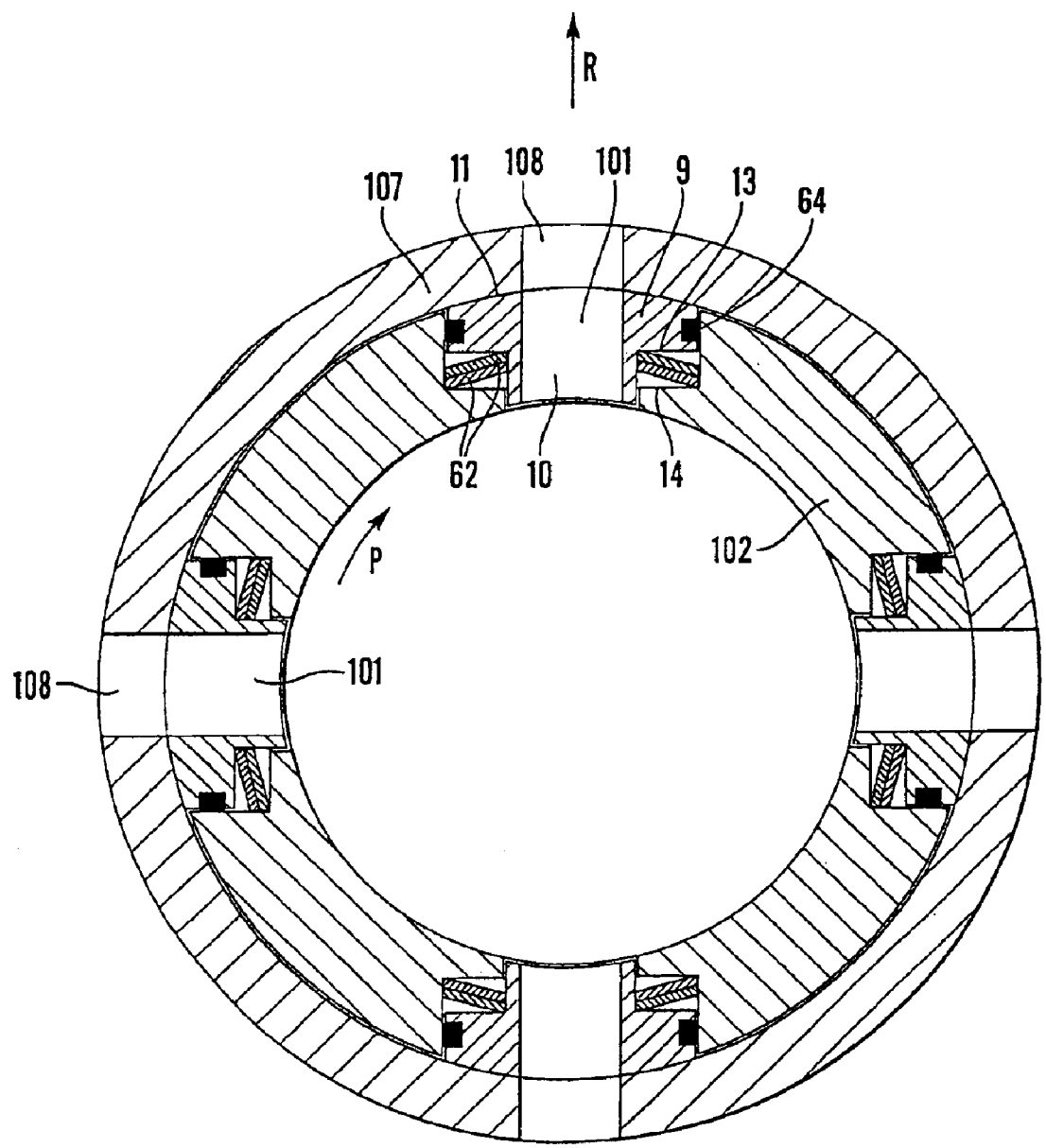

FIG. 12 shows a similar cross-section through another sleeve valve according to the invention. The sleeve valve in FIG. 12 is similar to the sleeve valve in FIG. 10, but with the difference that the radially movable sealing element 9, instead of being placed in a recess 71, is placed in the inner sleeve opening 101, and that the radial opening 10 in the sealing element 9 is adapted to correspond with the outer sleeve opening 108. The sleeve valve in FIG. 12 is shown in an open position, where the inner sleeve opening 101 and the outer sleeve opening 108 are aligned. Fluid is thus permitted to flow through the sealing element opening 10 and the outer sleeve opening 108.

Figure 13:
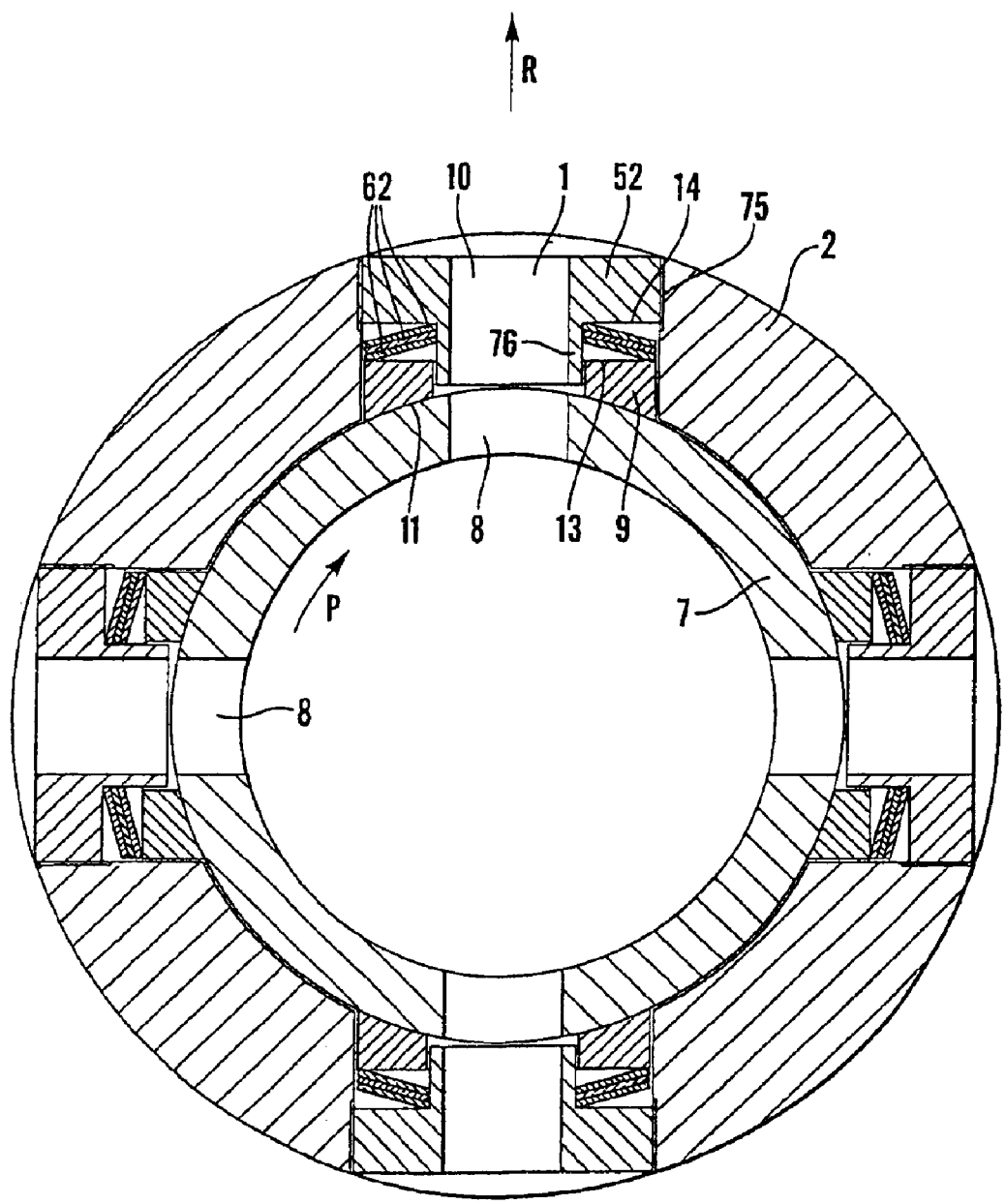

FIG. 13 shows a cross-section through another sleeve valve according to the invention. In the sleeve valve in FIG. 13, the first sleeve consists of an outer sleeve 2, whilst the second sleeve consists of an inner sleeve 7. A sealing element 9 that is radially movable in the direction R is placed in an opening 1 in the outer sleeve 2. The sealing element 9 is almost disc-shaped and has a sealing surface 11 that is adapted to rest against the outer surface of the inner sleeve 7, around the inner sleeve opening 8. Tension elements in the form of three disc springs 62 are arranged between the bearing portion 13 on the sealing element 9 and a bearing portion 14 that is formed by the underside of a cover 52 that is screwed in place in the outer sleeve 2 via a threaded portion 75. The disc springs 62 press the sealing element 9 with its sealing surface 11 against the inner sleeve 7. A cylindrical portion 76 of the cover 52 rests against the inner surface of a through-going radial opening 10 in the cover 52 and the sealing element 9. The opening 10 is adapted to correspond with the inner sleeve opening 8. The sleeve valve in FIG. 13 is shown in an open position. The sleeve valve can be brought into a closed position by relative rotation of the two sleeves 2, 7 in the direction P, so that the inner sleeve openings are brought out of alignment with the outer sleeve openings 1.

Figure 14:
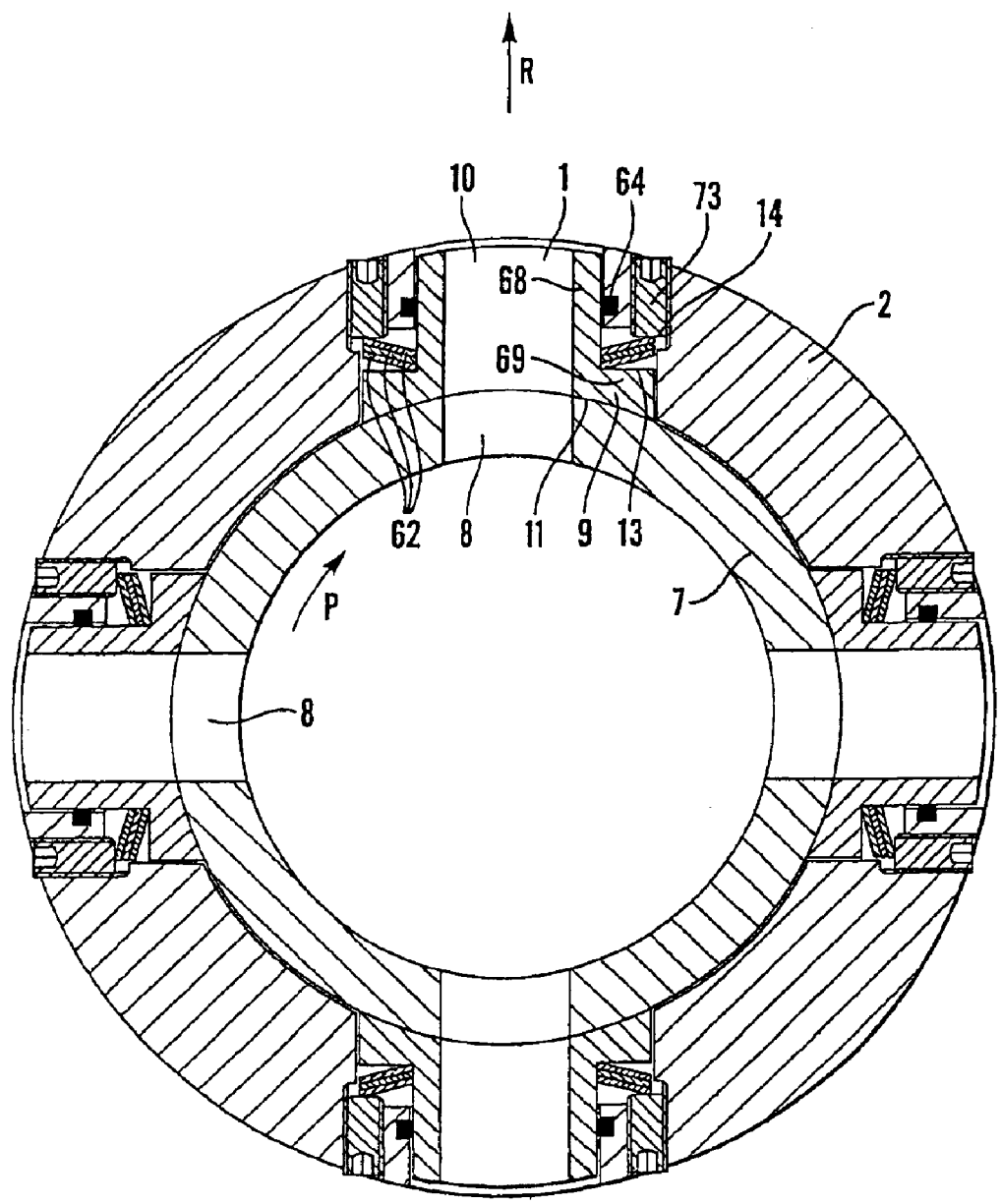

FIG. 14 shows a cross-section through another sleeve valve according to the invention. The sleeve valve in FIG. 14 is similar to the sleeve valve in FIG. 13, but with the difference that the bearing portion 14, instead of being formed by the underside of a cover 52, is formed by the tip of screws 73 that are screwed into the outer sleeve 2 from the outside, around the opening 1, and that the sealing element 9 instead of having an approximate disc shape comprises a collar portion 69 with the sealing surface 11 and a cylindrical portion 68 that is adapted to the inner surface of the outer sleeve valve opening 1. An O-ring 64 seals between the cylindrical portion 68 of the sealing element and the side of the opening 1.

Figure 15:
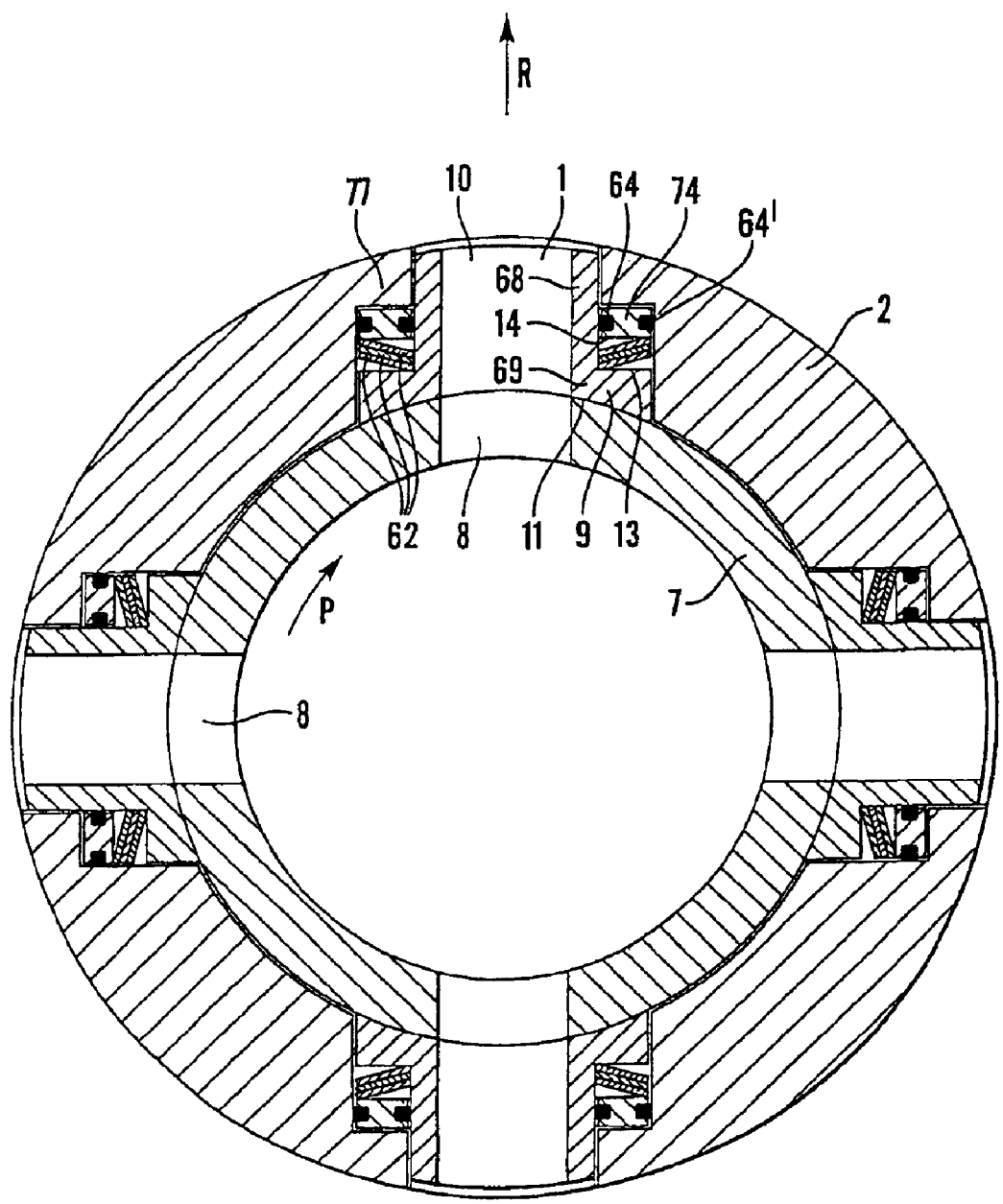

FIG. 15 shows a cross-section through another sleeve valve according to the invention. The sleeve valve in FIG. 15 is similar to the sleeve valve in FIG. 14, but with the difference that the bearing portion 14, instead of being formed by the tip of the screws 73, is formed by the underside of a sealing ring 74 that is held radially in place in the opening 1 by a collar 77 in the outer sleeve 2, and that instead of one O-ring, an inner O-ring 64 and an outer O-ring 64' arranged in grooves on each side of the sealing ring 74 are used and seal between the cylindrical portion 68 of the sealing element and the side of the opening 1.

Figure 16:
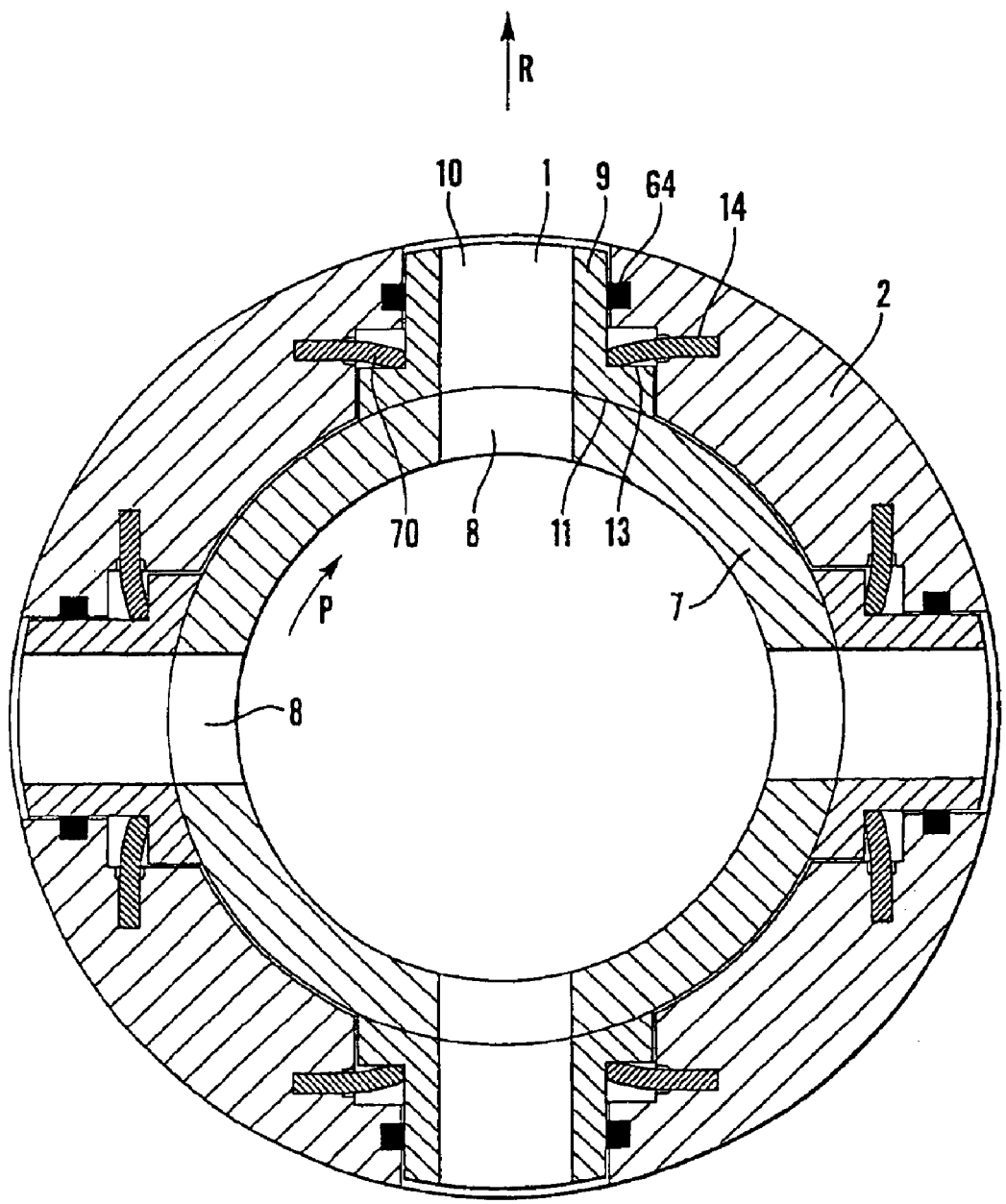

FIG. 16 shows a cross-section through another sleeve valve according to the invention. The sleeve valve in FIG. 16 is similar to the sleeve valve in FIG. 14, but with the difference that the tension elements, instead of being formed by disc springs 62, are formed by leaf springs 70. The leaf springs are fixed in the side of the opening 1 in the outer sleeve 2, and the bearing portions 14 of the tension elements in this case are formed by the fixed support of the leaf springs 70 instead of the tip of the screws 73.

What is claimed is:

1. A sleeve valve for controlling fluid flow between a hydrocarbon reservoir and tubing in a well in the hydrocarbon reservoir, the sleeve valve comprising a first sleeve and a second sleeve which by an actuator or a tool are relatively movable between positions in which at least one opening in the first sleeve is aligned or is misaligned with at least one opening in the second sleeve, in order to admit or shut off the fluid flow, the first sleeve in a recess or the opening being provided with a radially movable sealing element that has a sealing surface adapted to rest against the second sleeve around the opening in the second sleeve; and at least one tension element arranged between corresponding bearing portions on the sealing element and the first sleeve respectively and pressing the sealing element with its sealing surface against the second sleeve the first sleeve and second sleeve being relatively movable in that the first sleeve or the second sleeve is slidable in a longitudinal direction of the tubing.

2. The sleeve valve according to claim 1, wherein the radial movable sealing element has a through-going radial opening.

3. A The sleeve valve according to claim 2, wherein the radially movable sealing element is placed in the first sleeve's opening, and the radial opening in the sealing element is adapted to correspond with the second sleeve's opening.

4. The sleeve valve according to claim 1, wherein the at least one tension element comprises an elastomeric material.

5. The sleeve valve according to claim 1, wherein the at least one tension element consists of a disc spring.

6. The sleeve valve according to claim 1, wherein the at least one tension element consists of a stack of disc springs.

7. The sleeve valve according to claim 1, wherein the at least one tension element consists of one or more leaf springs.

8. A The sleeve valve according to claim 1, wherein the first sleeve and second sleeve are relatively movable in that the first sleeve or the second sleeve is rotatable about the longitudinal direction of the tubing.

9. The sleeve valve according to claim 1, wherein between the first sleeve and the sealing element there is arranged at least one seal that is placed in a recess in the first sleeve or the sealing element.

10. The sleeve valve according to claim 2, wherein the opening in the sealing element is adapted to choke the flow through the first sleeve opening and the second sleeve opening to a desired value.

11. The sleeve valve according to claim 1, wherein the sealing element comprises a cylindrical portion that is adapted to sliding movement in the recess or opening in the first sleeve, and a collar portion which on one side bears against the second sleeve and on the opposite side forms a rest for the tension element.

12. A sleeve valve for controlling fluid flow between a hydrocarbon reservoir and tubing in a well in the hydrocarbon reservoir, the sleeve valve comprising a first sleeve and a second sleeve which by an actuator or a tool are relatively movable between positions in which at least one opening in the first sleeve is aligned or misaligned with at least one opening in the second sleeve, in order to admit or shut off the fluid flow, the first sleeve in a recess or the opening being provided with a radially movable sealing element that has a sealing surface adapted to rest against the second sleeve around the opening in the second sleeve; and at least one tension element arranged between corresponding bearing portions on the sealing element and the first sleeve respectively and pressing the sealing element with its sealing surface against the second sleeve, the first sleeve and second sleeve being movable along a helical path in the longitudinal direction of the tubing.

13. A sleeve valve for controlling fluid flow between a hydrocarbon reservoir and tubing in a well in the hydrocarbon reservoir, the sleeve valve comprising a first sleeve and a second sleeve which by an actuator or a tool are relatively movable between position in which at least one opening in the first sleeve is aligned or misaligned with at least one opening in the second sleeve, in order to admit or shut off the fluid flow, the first sleeve in a recess or the opening being provided with a radially movable sealing element that has a sealing surface adapted to rest against the second sleeve around the opening in the second sleeve; and at least one tension element arranged between corresponding bearing portions on the sealing element and the first sleeve respectively and pressing the sealing element with its sealing surface against the second sleeve, around or on one or both sides of the opening in the first sleeve there is arranged at least one seal between the first sleeve and the second sleeve, which seals are placed in recesses in the first sleeve or the second sleeve, the seal comprises a double U or V-shaped lip seal that is open towards the first sleeve opening.

* * * * *